(12) United States Patent
Nakayama et al.

(10) Patent No.: US 11,926,050 B2
(45) Date of Patent: *Mar. 12, 2024

(54) ROBOT ARM, MANUFACTURING METHOD THEREFOR, AND ROBOT

(71) Applicant: FANUC CORPORATION, Yamanashi (JP)

(72) Inventors: Kazutaka Nakayama, Yamanashi (JP); Kenichirou Abe, Yamanashi (JP); Masahiro Morioka, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 854 days.

This patent is subject to a terminal disclaimer.

(21) Appl. No.: 16/440,458

(22) Filed: Jun. 13, 2019

(65) Prior Publication Data

US 2020/0030964 A1    Jan. 30, 2020

(30) Foreign Application Priority Data

Jul. 25, 2018  (JP) ................................ 2018-139197

(51) Int. Cl.
| | |
|---|---|
| *B25J 18/00* | (2006.01) |
| *B25J 9/00* | (2006.01) |
| *B25J 9/02* | (2006.01) |
| *F16L 9/14* | (2006.01) |
| *B25J 9/16* | (2006.01) |
| *B25J 19/00* | (2006.01) |

(52) U.S. Cl.
CPC .............. *B25J 9/0012* (2013.01); *B25J 9/02* (2013.01); *B25J 18/00* (2013.01); *F16L 9/14* (2013.01); *B25J 9/1669* (2013.01); *B25J 19/007* (2013.01)

(58) Field of Classification Search
CPC .......... B25J 9/0012; B25J 18/00; B29C 45/14
See application file for complete search history.

(56) References Cited

U.S. PATENT DOCUMENTS

| | | | |
|---|---|---|---|
| 5,428,713 | A | 6/1995 | Matsumaru |
| 10,456,907 | B2 * | 10/2019 | Nakayama ............. B25J 9/0024 |
| 10,618,185 | B2 * | 4/2020 | Nakayama ............... B25J 17/00 |
| 2009/0114054 | A1 | 5/2009 | Horiuchi et al. |
| 2010/0101359 | A1 | 4/2010 | Breu et al. |

(Continued)

FOREIGN PATENT DOCUMENTS

| | | |
|---|---|---|
| CN | 103386692 A | 11/2013 |
| CN | 203919086 U | 11/2014 |

(Continued)

OTHER PUBLICATIONS

Machine translation of Japanese Reference 60-118487, published Jun. 25, 1985.*

(Continued)

*Primary Examiner* — William C Joyce
(74) *Attorney, Agent, or Firm* — Maier & Maier, PLLC

(57) ABSTRACT

A robot arm includes a long cylindrical arm body and mounting interface portions fixed at both sides of the arm body and that are used to mount the robot arm to another member. At least sections of outer surfaces of the arm body and the mounting interface portions are formed of a resin. A first part that has one of the mounting interface portions and a section of the arm body and a second part that has the other one of the mounting interface portions and a section of the arm body are joined to each other.

17 Claims, 16 Drawing Sheets

(56) References Cited

U.S. PATENT DOCUMENTS

| | | | |
|---|---|---|---|
| 2010/0247947 A1 | 9/2010 | Tamura et al. | |
| 2014/0014219 A1 | 1/2014 | Takemura et al. | |
| 2014/0027995 A1* | 1/2014 | Kuroda | B60G 21/055 |
| | | | 280/124.152 |
| 2014/0338490 A1 | 11/2014 | Shinabe | |
| 2014/0342144 A1 | 11/2014 | Nakayama et al. | |
| 2015/0040713 A1 | 2/2015 | Hirano | |
| 2018/0147734 A1 | 5/2018 | Nakayama et al. | |
| 2018/0169760 A1* | 6/2018 | Negishi | B22F 7/08 |

FOREIGN PATENT DOCUMENTS

| | | | |
|---|---|---|---|
| CN | 104175328 A | | 12/2014 |
| CN | 205086007 U | | 3/2016 |
| CN | 106132642 A | | 11/2016 |
| CN | 205781548 | * | 12/2016 |
| CN | 108189024 | * | 6/2018 |
| CN | 108687796 A | | 10/2018 |
| EP | 1977865 A1 | | 10/2008 |
| EP | 2789648 A1 | | 10/2014 |
| EP | 2808132 A1 | | 12/2014 |
| EP | 2835226 A1 | | 2/2015 |
| JP | S55-142718 U | | 10/1980 |
| JP | S56-065223 U | | 6/1981 |
| JP | S59-102966 A | | 6/1984 |
| JP | 60-118487 | * | 6/1985 |
| JP | S60-221285 A | | 11/1985 |
| JP | S62-110100 A | | 5/1987 |
| JP | S63-174505 A | | 7/1988 |
| JP | 63-214429 | * | 9/1988 |
| JP | H05-245784 A | | 9/1993 |
| JP | H06-079683 A | | 3/1994 |
| JP | H06-066988 U | | 9/1994 |
| JP | H08-057791 A | | 3/1996 |
| JP | H08-218820 A | | 8/1996 |
| JP | 2002-018768 A | | 1/2002 |
| JP | 2002172583 A | | 6/2002 |
| JP | 2003-326491 A | | 11/2003 |
| JP | 2006-110641 A | | 4/2006 |
| JP | 2007-175844 A | | 7/2007 |
| JP | 2009-126010 A | | 6/2009 |
| JP | 2009-190149 A | | 8/2009 |
| JP | 2009-195998 A | | 9/2009 |
| JP | 2010-076071 A | | 4/2010 |
| JP | 2010-125531 A | | 6/2010 |
| JP | 2010-149166 A | | 7/2010 |
| JP | 2010268978 A | | 12/2010 |
| JP | 2012-061545 A | | 3/2012 |
| JP | 2012-116968 A | | 6/2012 |
| JP | 2012-161886 A | | 8/2012 |
| JP | 2013-018058 A | | 1/2013 |
| JP | 2013-116999 A | | 6/2013 |
| JP | 2015-033749 A | | 2/2015 |
| JP | 2015-033750 A | | 2/2015 |
| JP | 2015-183121 A | | 10/2015 |
| JP | 2016-173157 A | | 9/2016 |
| JP | 2017-179013 A | | 10/2017 |
| JP | 2018052266 A | | 4/2018 |
| JP | 2018-086698 A | | 6/2018 |
| JP | 2018-100445 A | | 6/2018 |
| JP | 2018-167338 A | | 11/2018 |
| JP | 2020-015212 A | | 1/2020 |
| KR | 10-1805304 | * | 12/2017 |
| KR | 101866128 B1 | | 7/2018 |

OTHER PUBLICATIONS

Iwasaki, Yu; Notice of Reasons for Refusal; Japanese Patent Application No. 2018-139197; dated Sep. 29, 2020; 8 pages.
Industrial Property Cooperation Center; Search Report by Registered Search Organization; dated Sep. 14, 2020; 24 pages.
Iwasaki, Yu; Notice of Reasons for Refusal; Japanese Patent Application No. 2018-139197; dated Feb. 2, 2021; 7 pages.
Japanese Patent Office, Notice of Reasons for Refusal dated Jul. 5, 2022 in Japanese Patent Application No. 2021-111012, 10 pages.
Industrial Property Cooperation Center, Search Report by Registered Search Organization, dated May 31, 2022, 63 pages.
The State Intellectual Property Office of People's Republic of China, First Office Action dated Mar. 12, 2019 in Chinese Patent Application No. 201810266553.X, 10 pages.
Industrial Property Cooperation Center, Search Report by Registered Search Organization, dated Dec. 17, 2018, 19 pages.
Japanese Patent Office, Decision to Grant a Patent dated Dec. 25, 2018 in Japanese Patent Application No. 2017077796.A, 7 pages.
Japanese Patent Office, Memorandum of Decision to Grant a Patent dated Dec. 18, 2018 in Japanese Patent Application No. 2017-077796, 3 pages.

* cited by examiner

ROBOT ARM, MANUFACTURING METHOD THEREFOR, AND ROBOT

CROSS-REFERENCE TO RELATED APPLICATIONS

This application is based on Japanese Patent Application No. 2018-139197, the contents of which are incorporated herein by reference.

TECHNICAL FIELD

The present invention relates to a robot arm, a manufacturing method therefor, and a robot.

BACKGROUND ART

In general, industrial robot arms are made of a metal, such as an aluminum alloy, in order to maintain strength while achieving weight reduction (for example, see Japanese Unexamined Patent Application, Publication No. 2013-018058).

SUMMARY OF INVENTION

According to one aspect, the present invention provides a robot arm including: a long cylindrical arm body; and mounting interface portions that are fixed to both sides of the arm body and that are used to mount the robot arm to another member, wherein at least sections of outer surfaces of the arm body and the mounting interface portions are formed of a resin; and a first part that has one of the mounting interface portions and a section of the arm body and a second part that has the other one of the mounting interface portions and another section of the arm body are joined to each other.

In the above-described aspect, each of the mounting interface portions may be provided with: a metal member that forms a mounting surface used to mount the robot arm to the other member; and a connection section that is formed of a resin, in which the metal member is embedded in a state in which at least the mounting surface on the metal member is exposed, and that is connected to the arm body.

In the above-described aspect, the metal member may be formed into a ring-shaped plate having, at the center thereof, a center hole penetrating therethrough in the plate-thickness direction; and the connection section may have an internal space that is connected to an inner hole of the arm body and that is open to the outside in the center hole of the metal member.

In the above-described aspect, the mounting surface may be disposed in parallel with the longitudinal axis of the arm body.

In the above-described aspect, the metal member may have a through-hole that penetrates therethrough in the plate-thickness direction and through which a mounting screw is made to pass, and the metal member may be embedded in the resin that forms the connection section, with the mounting surface and a seating surface, for the mounting screw, around the through-hole being exposed, the seating surface being located on a back surface of the mounting surface.

In the above-described aspect, the resin that forms each of the mounting interface portions and the metal member may be fixed to each other by fitting a projecting portion that is provided in one of the resin and the metal member into a recessed portion that is provided in the other one of the resin and the metal member.

In the above-described aspect, the two metal members may be electrically conductive.

In the above-described aspect, the metal members may be formed of a metal material having higher corrosion resistance than aluminum, for a combination with carbon fibers.

In the above-described aspect, the first part and the second part may have the same shape.

In the above-described aspect, the second part may be obtained by joining a third part that has the same shape as the first part to a fourth part that extends a section of the arm body, the section corresponding to the third part.

In the above-described aspect, the fourth part may be a tubular body that is formed of a resin and that is uniform in cross section.

In the above-described aspect, the fourth part may be a tubular body that is obtained by coating an outer surface of a metal pipe with a resin and that is uniform in cross section.

In the above-described aspect, the first part and the second part may be joined by means of a mechanical coupling element.

In the above-described aspect, the resin that forms the arm body and the mounting interface portions may have such flame retardance that, even when the arm body and the mounting interface portions are disposed in the vertical direction and are subjected to fire for 10 seconds, flame duration is 10 seconds or less, and the arm body and the mounting interface portions do not burn by 127 mm or more.

In the above-described aspect, outer surfaces of the resin that forms the arm body and the mounting interface portions may be coated with a paint having such flame retardance that, even when the arm body and the mounting interface portions are disposed in the vertical direction and are subjected to fire for 10 seconds, flame duration is 10 seconds or less, and the arm body and the mounting interface portions do not burn by 127 mm or more.

According to another aspect, the present invention provides a robot-arm manufacturing method for a robot arm that has, at both ends of a long cylindrical arm body, mounting interface portions for mounting the robot arm to another member, the method including: molding a first part that has one of the mounting interface portions and a section of the arm body, and of which at least a section of an outer surface is formed of a resin; molding a second part that has the other one of the mounting interface portions and another section of the arm body, and of which at least a section of an outer surface is formed of a resin; and joining the molded first part and the molded second part to each other in a positioned state.

In the above-described aspect, the first part and the second part may be molded through injection molding or press molding.

According to still another aspect, the present invention provides a robot-arm manufacturing method for a robot arm that has, at both ends of a long cylindrical arm body, mounting interface portions for mounting the robot arm to another member, the method including: molding a first part and a third part that have the mounting interface portions and sections of the arm body, of which at least sections of outer surfaces are formed of a resin, and that have the same shape; molding a cylindrical fourth part that extends the section of the arm body, the section corresponding to the first part; and disposing the fourth part between the molded first part and the molded third part and joining them to one another in a positioned state.

In the above-described aspect, the first part, the third part, and the fourth part may be molded through injection molding or press molding.

In the above-described aspect, the first part, the third part, and the fourth part may be fixed in the same forming mold in a positioned state and may be then integrally joined so as to form the final shape of the robot arm.

According to still another aspect, the present invention provides a robot including one of the above-described robot arms.

The above-described aspect may further include at least one robot arm that is identical to the robot arm.

In the above-described aspect, the mounting interface portions of the respective robot arms may have the same shape; and the arm bodies of the respective robot arms may have different lengths.

In the above-described aspect, the robot arms may have the same length.

DESCRIPTION OF EMBODIMENTS

Figure 1:
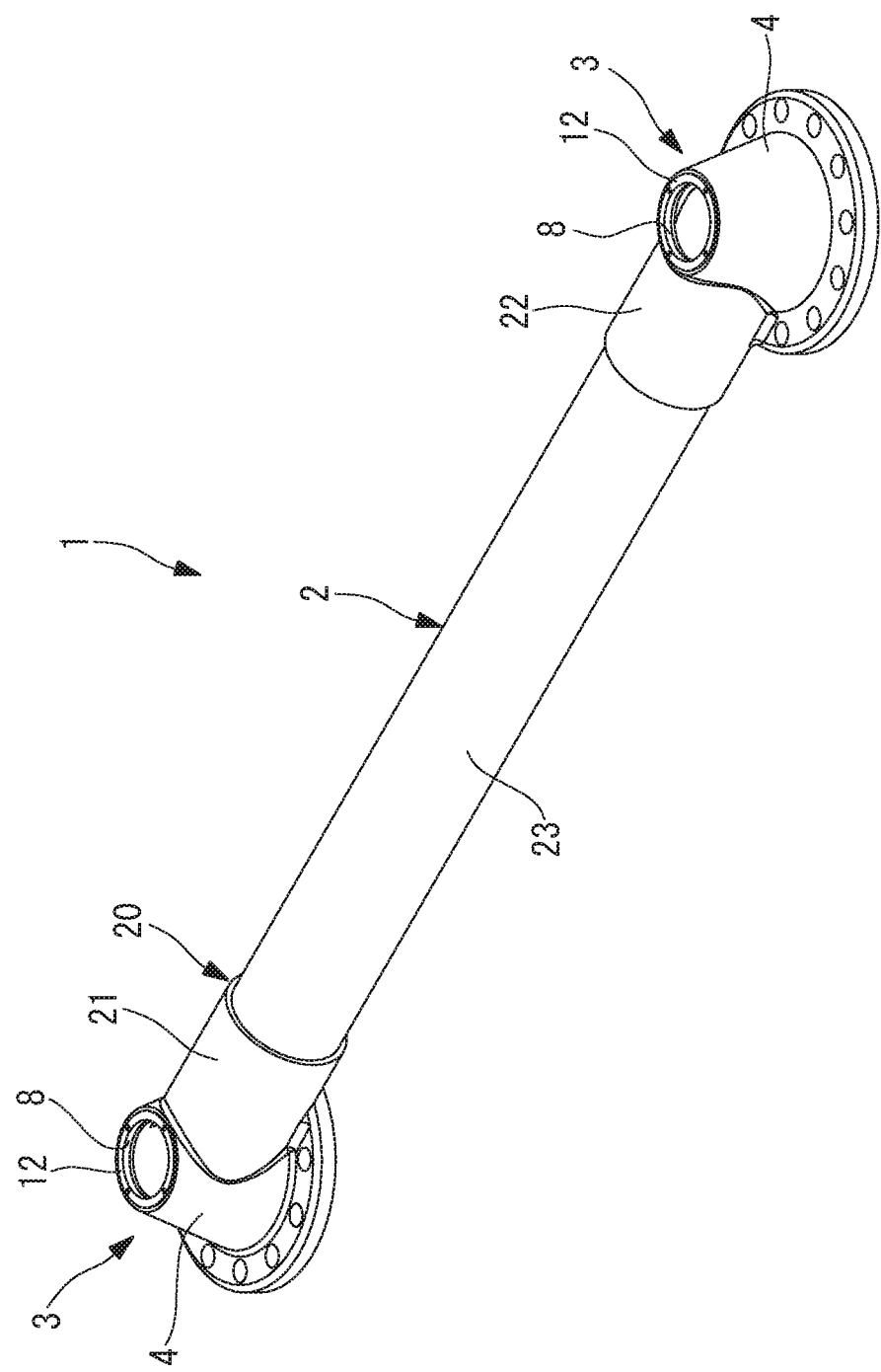
FIG. 1 is a perspective view showing a robot arm according to one embodiment of the present invention.

A robot arm 1, a manufacturing method therefor, and a robot 100 according to one embodiment of the present invention will be described below with reference to the drawings.

As shown in FIGS. 1 to 5, the robot arm 1 of this embodiment is provided with: an arm body 2 that has a cylindrical pipe shape; and two mounting interface portions 3 that are provided at both ends of the arm body 2 in the longitudinal-axis direction.

The arm body 2 is formed of a resin.

The mounting interface portions 3 are each provided with: a connection section 4 that is formed of a resin and that is connected to the arm body 2; and a flat metal plate (metal member) 5 that is embedded in the resin that forms the connection section 4. The connection sections 4 are disposed at such positions as to obstruct an inner hole 2a of the arm body 2 at both ends thereof, and have a substantially circular truncated cone shape extending in a direction perpendicular to the longitudinal axis of the arm body 2.

The metal plate 5 is disposed, on a section of the circular-truncated-cone-shaped connection section 4 corresponding to the bottom surface thereof, parallel to the longitudinal axis of the arm body 2 and is embedded in the resin that forms the connection section 4, for example, through insert molding.

Figure 2:
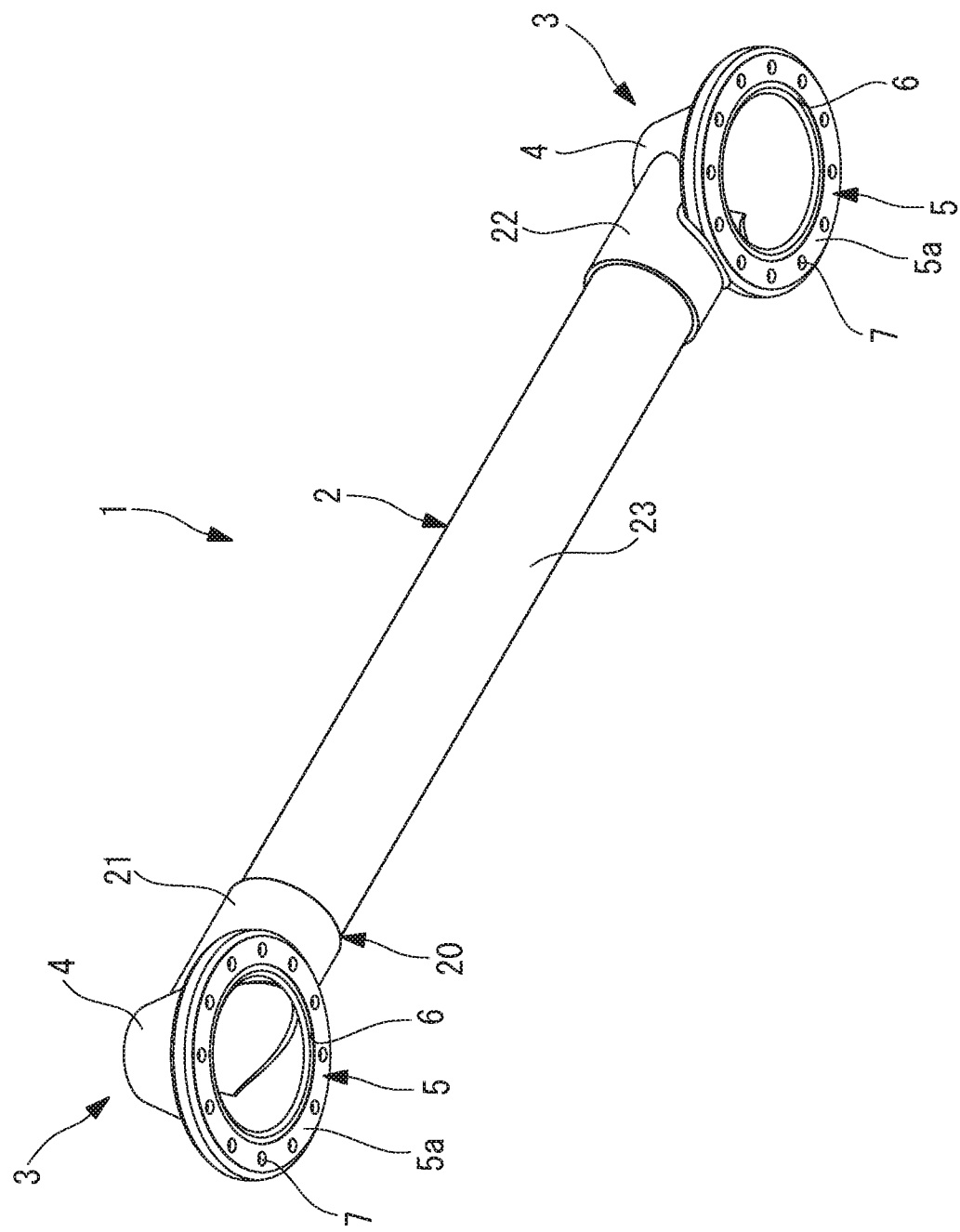
FIG. 2 is a perspective view of the robot arm shown in FIG. 1, viewed from a mounting-surface side.
Figure 3:
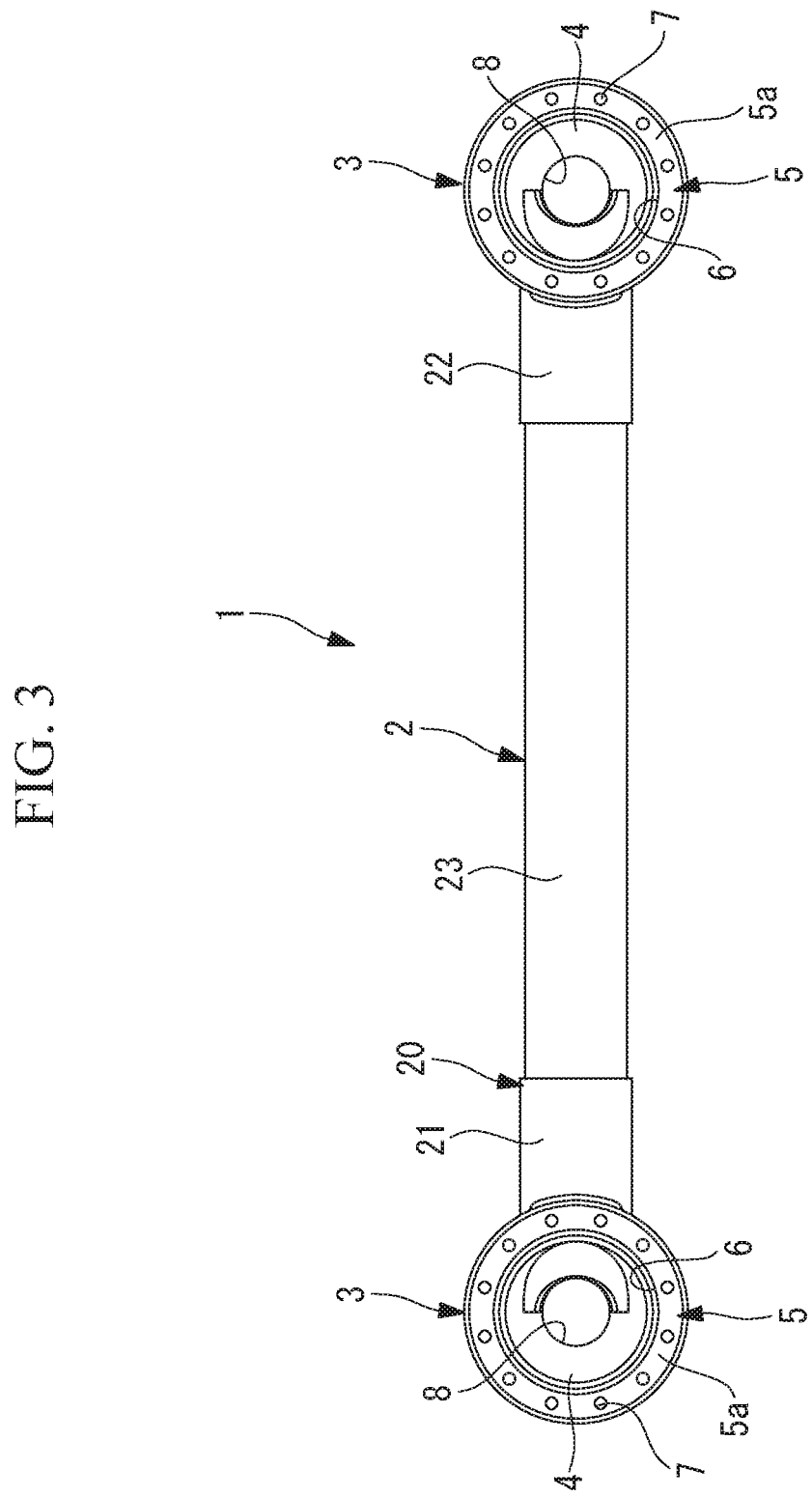
FIG. 3 is a view of the robot arm shown in FIG. 1, viewed from the mounting-surface side.
Figure 4:
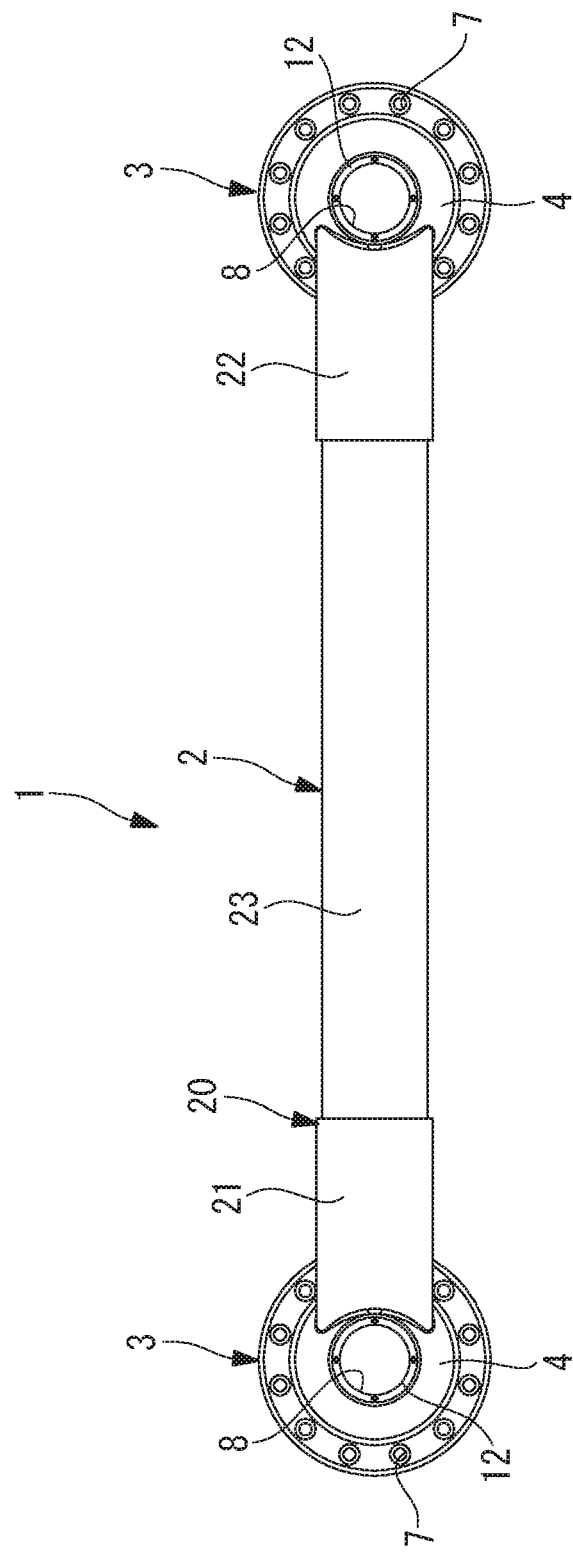
FIG. 4 is a plan view of the robot arm shown in FIG. 1.
Figure 5:
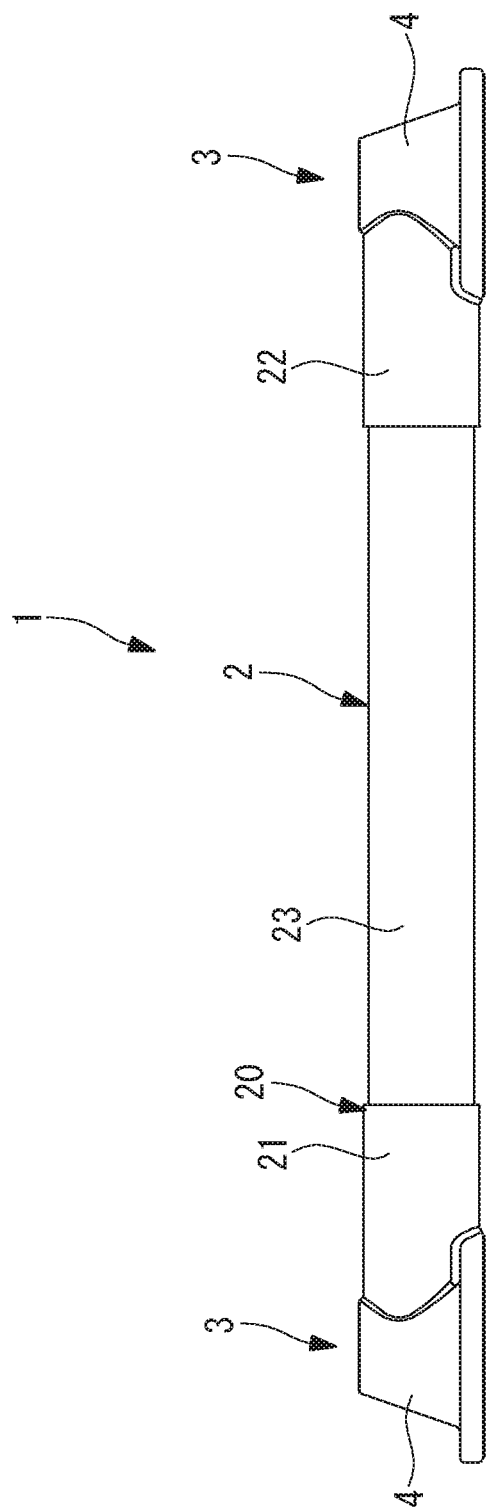
FIG. 5 is a side view of the robot arm shown in FIG. 1.

As shown in FIGS. 2 and 3, the metal plate 5 is formed into a ring-shaped plate having a center hole 6. The metal plate 5 is provided with a plurality of through-holes 7 that penetrate therethrough in the plate-thickness direction, at intervals in the circumferential direction.

Figure 6:
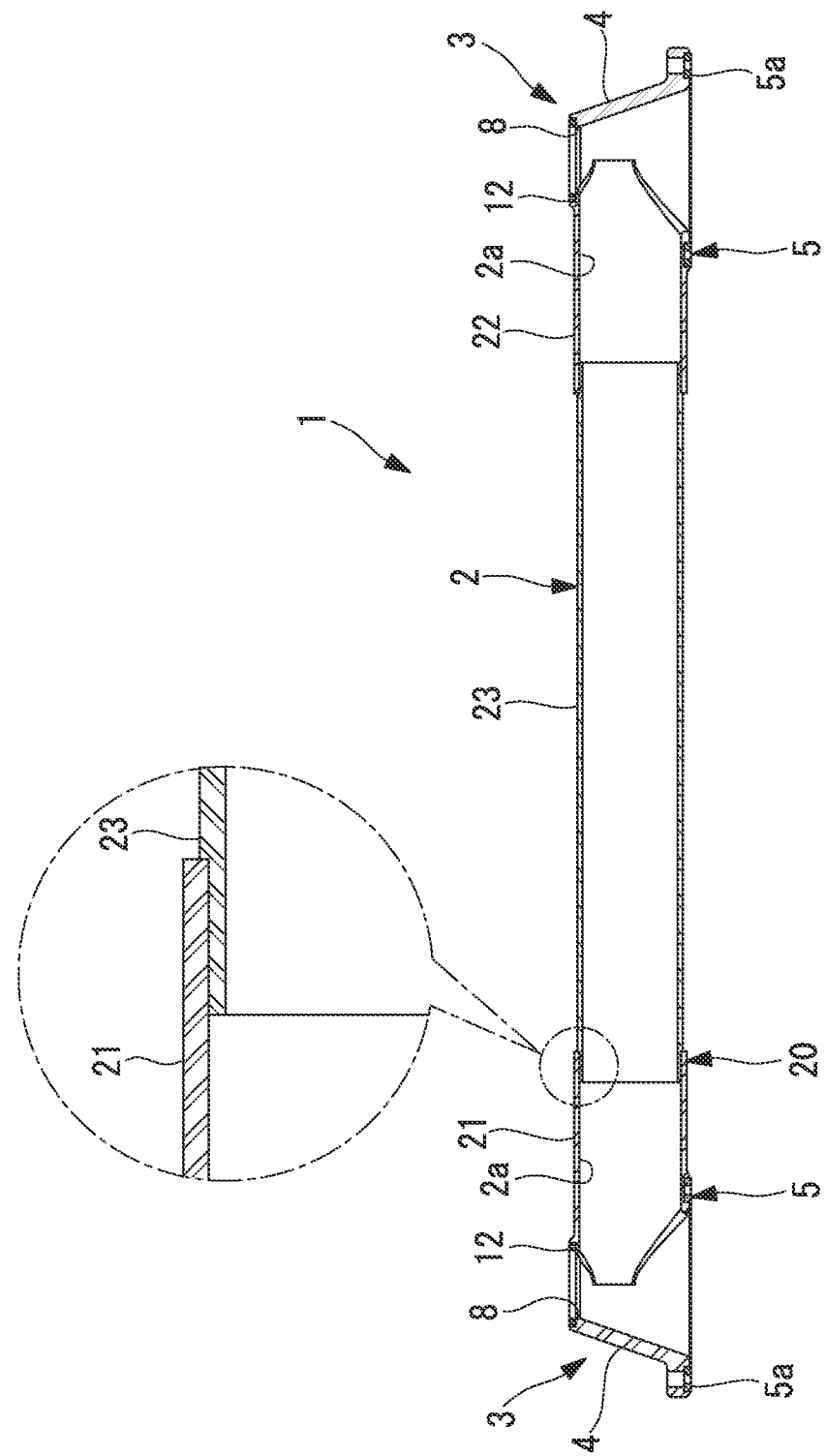
FIG. 6 is a longitudinal sectional view showing the robot arm shown in FIG. 1.

As shown in FIG. 6, the respective connection sections 4 are formed to be hollow, and inner holes of the connection sections 4 are connected to the inner hole 2a of the arm body 2 connected to side walls of the connection sections 4. Accordingly, the inner hole 2a of the arm body 2 is bent inside the connection sections 4 and is open to the center holes 6 of the two metal plates 5. In FIG. 6, although an outer circumferential surface of the arm body 2 is fitted into inner circumferential surfaces of a first part 21 and a third part 22, outer circumferential surfaces of the first part 21 and the third part 22 may also be fitted into an inner circumferential surface of the arm body 2.

One surface of the metal plate 5 in the plate-thickness direction serves as a mounting surface 5a, and the mounting surface 5a is entirely exposed.

Figure 7:
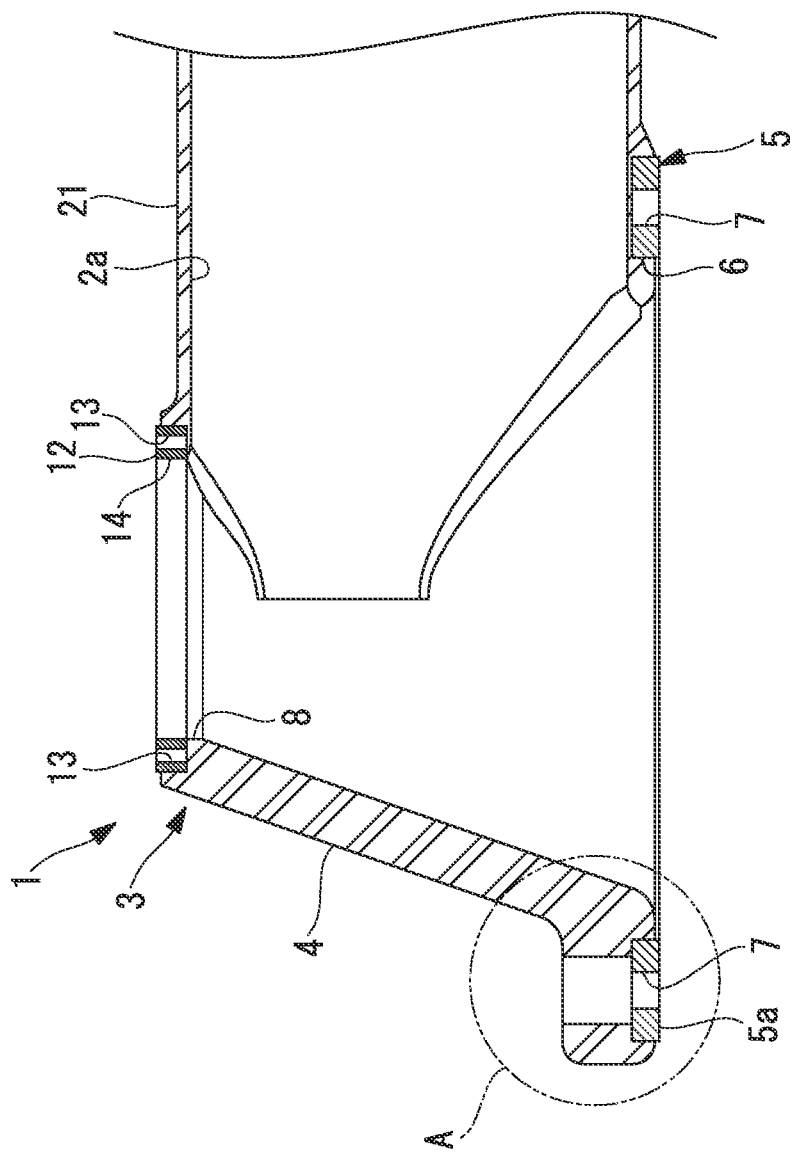
FIG. 7 is a partially enlarged longitudinal sectional view showing a mounting interface portion of the robot arm shown in FIG. 1.

The other surface of the metal plate 5 in the plate-thickness direction is covered with the resin that forms the connecting section 4, as shown in FIG. 7, in a state in which the surroundings of some of the through-holes 7 are partially exposed. The surface of the metal plate 5 that is exposed around each of the through-holes 7 is exposed so as to be slightly larger than the outer diameter of the head of a mounting screw (see FIG. 10) 9 to be inserted into the through-hole 7, and functions as a seating surface for the mounting screw 9.

The through-holes 7 that are arranged at positions overlapping with the arm body 2 are covered with the resin that forms the connecting section 4 so as to close those through-holes 7, without exposing the corresponding section of the metal plate 5 as the seating surface. With this configuration, when positioning pins are inserted, the positioning pins can be prevented from being detached through the operation of the robot 100, etc.

The mounting surfaces 5a of the metal plates 5 are disposed at positions protruding from the resin that forms the connecting sections 4. Then, the mounting surfaces 5a of the metal plates 5 on the two connecting sections 4 are disposed in the same plane.

The connecting sections 4 are each provided with an opening portion 8 that makes the space inside the connecting section 4 open to the outside at a different place from the central hole 6 of the metal plate 5. In FIG. 1, although the opening portion 8 is provided at the opposite side from the central hole 6, the position thereof is not limited thereto, and the opening portion 8 may also be provided at a lateral side of each of the connection sections 4. The opening portion 8 can be closed by a lid member 10, to be described later.

In this embodiment, as shown in FIGS. 1 to 6, the robot arm 1 is formed by mutually joining: the two end parts (the first part and the third part) 21 and 22, which are each provided with one of the mounting interface portions 3 and a section of the arm body 2 connected to the mounting interface portion 3; and a simple cylinder-shaped central part (fourth part) 23, which is disposed between the two end parts 21 and 22 and which forms a center section of the arm body 2. Here, the end part 21 and the central part 23 constitute a second part 20.

The manufacturing method for the thus-configured robot arm 1 of this embodiment will be described below.

Figure 8:
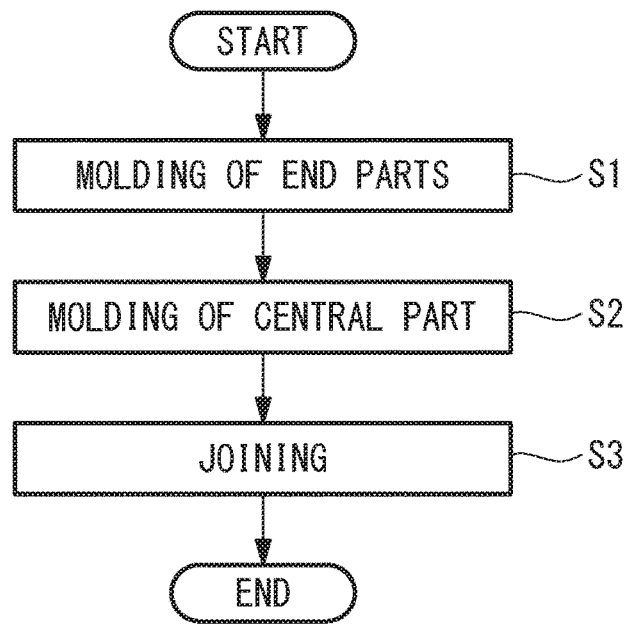
FIG. 8 is a flowchart showing a robot-arm manufacturing method according to the one embodiment of the present invention.

As shown in FIG. 8, the manufacturing method of this embodiment includes: molding the two end parts 21 and 22 (Step S1); molding the central part 23 (Step S2); and disposing the two end parts 21 and 22 at both ends of the central part 23 and mutually joining the three parts 21, 22, and 23 (Step S3).

The end parts 21 and 22 can each be easily manufactured through insert molding with a resin in a state in which the metal plate 5, which is precisely manufactured through machining etc., is positioned in a forming mold. Specifically, the end parts 21 and 22 can each be easily molded through injection molding or press molding using a forming mold.

Here, in the robot arm 1 of this embodiment, because the mounting interface portions 3 are disposed at both ends of the cylindrical arm body 2, the inner hole 2a of the arm body 2 is obstructed by the connection sections 4 at both ends. Thus, the entirety of the robot arm 1 cannot be molded in one step by a molding method using a forming mold.

With regard to this issue, in this embodiment, because the robot arm 1 is divided into the central part 23 and the two end parts 21 and 22, in each of the end parts 21 and 22, the inner hole 2a of the arm body 2 and the inner hole of the connection section 4 are open in one direction. Specifically, by devising an appropriate forming-mold divided structure, the end parts 21 and 22 can be easily manufactured by using a forming mold.

Because the central part 23 is a simple cylindrical member, the central part 23 can be easily molded through drawing or extrusion.

The number of types of parts that are used can be reduced by using, as the two end parts 21 and 22, end parts having the same shape. By reducing the number of types of parts that are used, it is possible to facilitate management of parts and to reduce the number of types of forming molds, thus making it possible to effectively reduce the manufacturing cost.

By adopting a simple cylindrical member as the central part 23, which connects the two end parts 21 and 22 having the same shape, there is an advantage in that length adjustment in the longitudinal-axis direction is easy, thus making it possible to easily manufacture the robot arms 1 that have different lengths. Accordingly, it is possible to form various lengths of the robot arms 1 among which only the lengths of arm bodies 2 differ.

Then, in Step S3, after the two end parts 21 and 22, in particular, surfaces thereof on one side that serve as the mounting surfaces 5a of the two metal plates 5 provided on the end parts 21 and 22, have been precisely positioned in the same plane by using a jig or the like and fixed, integral joining is performed so as to form the final shape of the robot arm 1 by an arbitrary joining method, e.g., injection molding or press molding, thereby making it possible to manufacture the robot arm 1 of this embodiment, which is provided with the two mounting interface portions 3 at both ends of the arm body 2.

According to the thus-manufactured robot arm 1 of this embodiment, because almost the whole of the robot arm 1 is formed of a resin, it is possible to achieve significant weight reduction, compared with a case in which the robot arm is formed of a metal, such as an aluminum alloy.

Because the metal plates 5, which have been precisely formed, are manufactured through insert molding, the mounting surfaces 5a of the two metal plates 5 can be precisely disposed without being machined. Accordingly, machining becomes unnecessary, thus making it possible to reduce the manufacturing cost.

In particular, because the mounting surfaces 5a of the metal plates 5 are made to protrude from the resin that forms the connecting sections 4, there is an advantage in that the resin does not become an obstacle when the robot arm 1 is mounted on a reducer output shaft 110.

Figure 9:
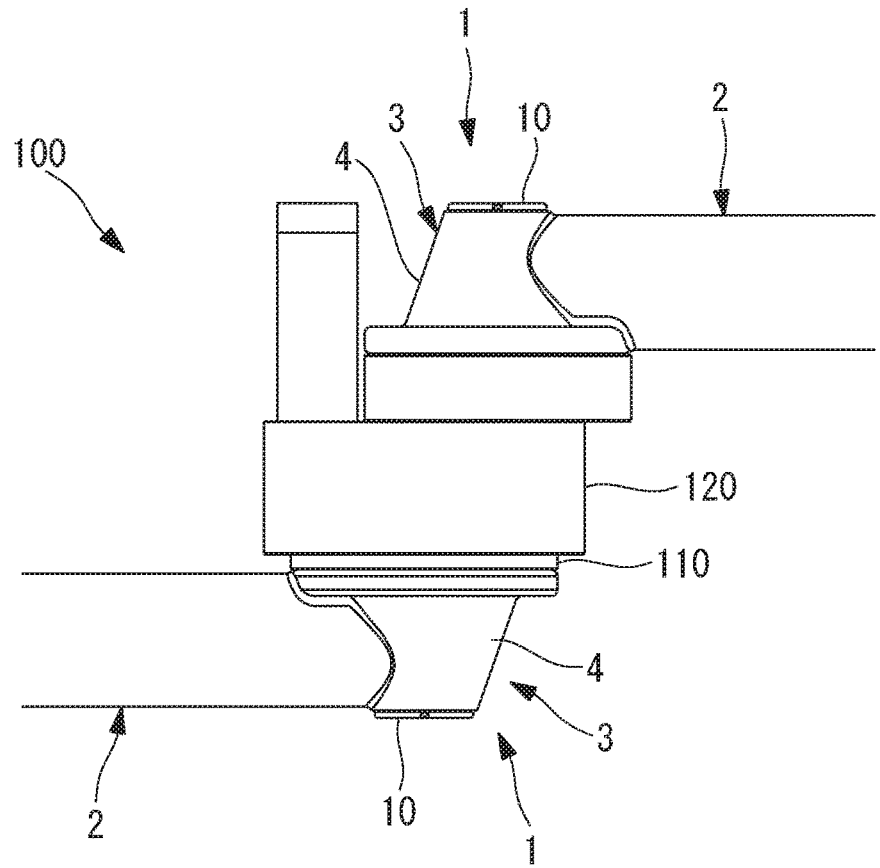
FIG. 9 is a front view showing a joint shaft portion of a robot in which the robot arm shown in FIG. 1 is attached to a reducer.
Figure 10:
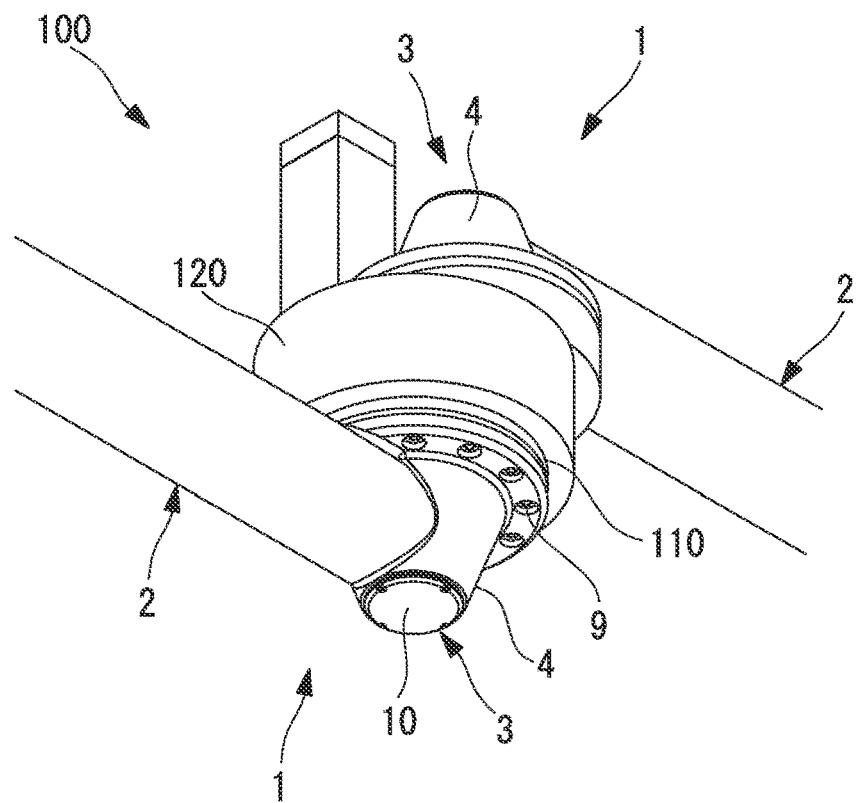
FIG. 10 is a perspective view showing the joint shaft portion shown in FIG. 9.

Then, as shown in FIGS. 9 and 10, the robot arm 1 is fixed to the reducer output shaft 110 etc. of the robot 100, thereby making it possible to easily form a joint shaft of the robot 100.

In this case, mounting screws 9 are made to pass through the through-holes 7, which are provided in the metal plate 5, and are fastened into screw holes in the reducer output shaft 110, thereby making it possible to press the heads of the mounting screws 9 against the seating surface, which is the surface located on the opposite side of the metal plate 5 from the mounting surface 5a.

Specifically, if there is resin between the heads of the mounting screws 9 and the reducer output shaft 110, sufficient fastening cannot be implemented, thus causing a concern that the mounting screws 9 will become loose after the robot 100 is repeatedly operated; however, in this embodiment, because only the metal plate 5 is disposed between the heads of the mounting screws 9 and the reducer output shaft 110, there is an advantage in that it is possible to implement fastening with sufficient fastening strength and to reliably prevent the mounting screws 9 from becoming loose.

Figure 11:
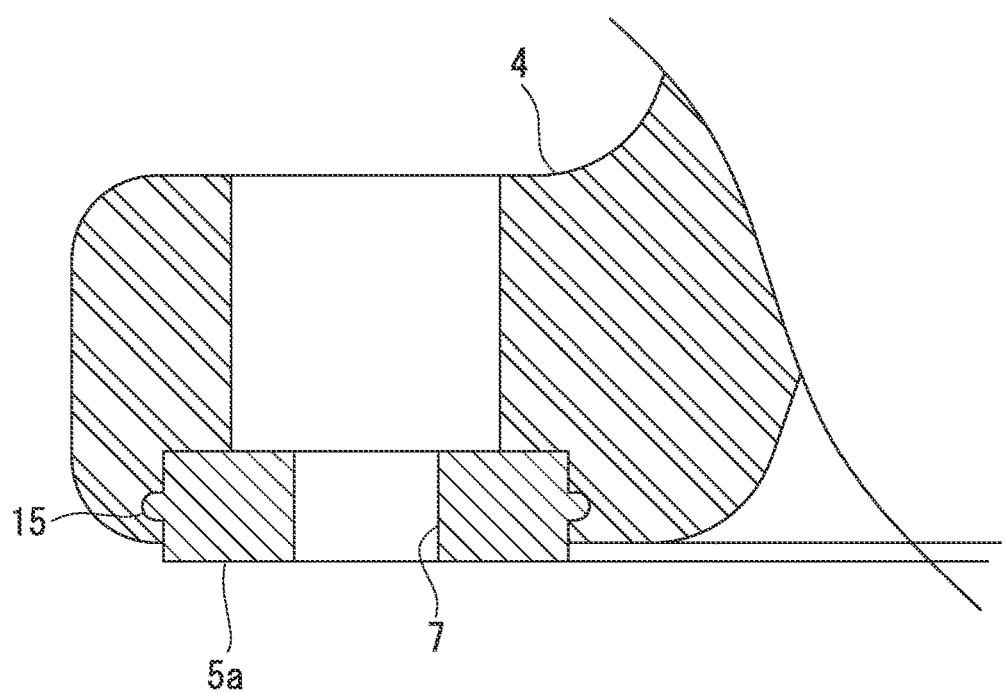
FIG. 11 is an enlarged longitudinal sectional view of a portion A shown in FIG. 7.

However, it is necessary to take great care so as to prevent the metal plate 5 itself from becoming detached from the resin member of the connecting section 4 due to the load. In view of this, as shown in FIG. 11, it is preferable to employ a structure in which a projecting portion 15 that protrudes radially is provided at a position, on the side surface of the metal plate 5, away from the mounting surface 5a in the thickness direction. By doing so, because the metal plate 5 is formed into an uneven shape in cross section in the longitudinal direction, the projecting portion 15 is held by the connecting section 4, thus making it possible to prevent the metal plate 5 from becoming detached unless the resin member of the connecting section 4 is broken.

Figure 12:
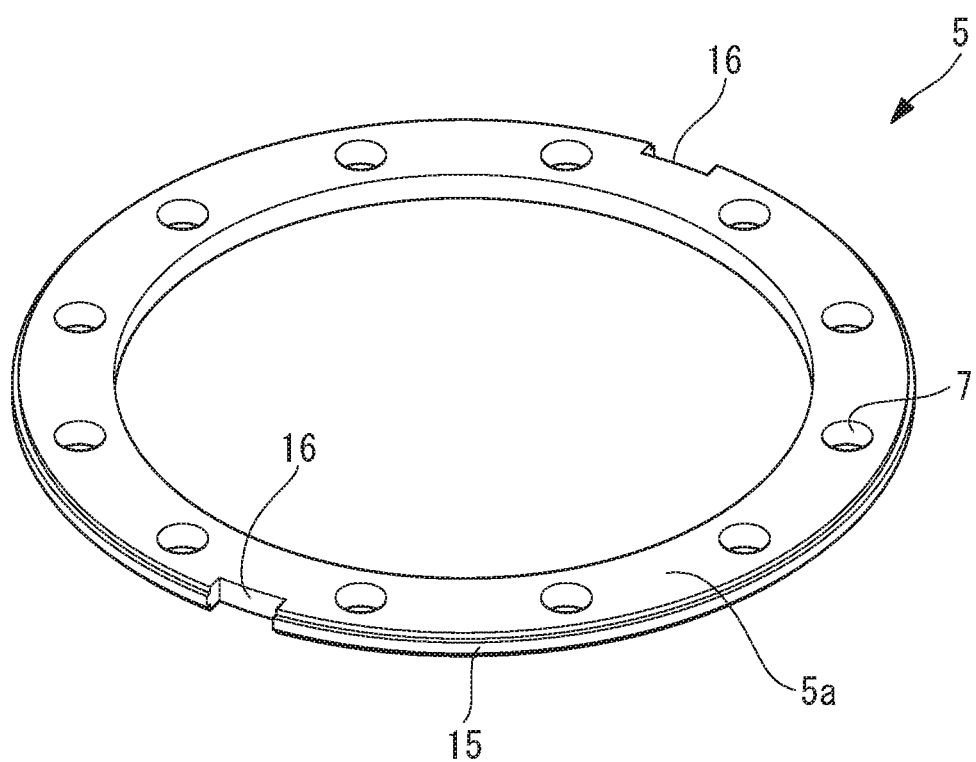
FIG. 12 is a perspective view showing a modification of a metal plate shown in FIG. 11.

Although the structure in which the projecting portion 15 is provided on the metal plate 5 is shown as an example, instead of this, it is also possible to provide, on the side surface of the metal plate 5, a recessed portion 16 that is radially recessed at a middle position in the thickness direction. As shown in FIG. 12, it is also possible to provide the recessed portion 16, which is radially recessed, at at least one position in the circumferential direction. Accordingly, even if a torque acts on the metal plate, it is possible to prevent the occurrence of a position shift between the metal plate and the resin that forms the connection section. For a further increase in strength and rigidity, a structural adhesive may also be used at the same time.

According to the robot arm 1 of this embodiment, the arm body 2 is formed into a hollow pipe shape having the inner hole 2a, the metal plates 5 are each formed into a ring-shaped plate having the center hole 6, and the connection sections 4 are each formed to be hollow so as to make the inner hole 2a open to the center hole 6; thus, one space that continues from the mounting surface 5a on one of the mounting interface portions 3 to the mounting surface 5a on the other mounting interface portion 3 through the inner hole 2a of the arm body 2 is formed inside the robot arm 1. Accordingly, there is an advantage in that it is possible to pass wiring, such as a cable, through this space and to wire the wiring without causing the wiring to be exposed to the outside.

Because the opening portion 8, which makes the space in the connecting section 4 open to the outside on the opposite side from the central hole 6 of the metal plate 5, is provided, there is an advantage in that it is possible to access the internal space of the robot arm 1 via the opening portion 8 in a state in which the central hole 6 of the metal plate 5 is closed by fixing the mounting surface 5a to a mounting-target body, such as an actuator 120, thus making it possible to easily perform fixing work, wiring work, etc. for the wiring.

As shown in FIG. 10, in order to fix the lid member 10, which closes the opening portion 8, to the connecting section 4 by means of screws, as shown in FIG. 7, a metal plate 12 that is formed into a ring-shaped plate having a center hole 14 communicating with the opening portion 8 is embedded in the connection section 4 through insert molding, and screw holes 13 are provided in the metal plate 12, thereby making it possible to fix the lid member 10 so as not to become loose. By firmly fastening the lid member 10, the strength of the robot arm 1 can be increased.

Although the through-holes 7 around which the surface of the metal plate 5 serving as the seating surface is exposed can be used to fix the robot arm 1 to the reducer output shaft 110 or the like by using the mounting screws 9, as described above, the through-holes 7 that overlap with the arm body 2, thus being closed by the resin, can also be used as pinholes into which positioning pins for positioning between the robot arm 1 and the reducer output shaft 110 in the circumferential direction are fitted.

Although a robot arm that is manufactured in a state in which the mounting surfaces 5a of the two metal plates 5 have been positioned so as to be disposed in the same plane is shown as an example of the robot arm 1 of this embodiment, instead of this, it is also possible to manufacture the robot arm 1 in a state in which the mounting surfaces 5a of the two metal plates 5 have been positioned so as to be disposed parallel to each other.

In this embodiment, although the metal plate 5, which is a ring-shaped plate member having the central hole 6 and the plurality of through-holes 7 around the central hole 6, is shown as an example metal member, instead of this, a plurality of washer-like metal members each having a single through-hole 7 may be disposed around the central hole 6 and may be embedded in the resin that forms the connecting section 4.

In this embodiment, although a description has been given of a case in which the arm body 2 is formed of a resin, instead of this, it is also possible to adopt a member that is obtained by coating, with a resin, the surface of a thin cylindrical member that is formed of a metal, such as aluminum. It is possible to increase the rigidity of the arm body 2 by additionally using a metal and to achieve weight reduction by reducing the amount of metal that is used through combined use of both of the metal and the resin. An outer surface of the robot arm 1 is formed of the resin, thereby making it possible to form the robot arm 1 having a relatively soft surface.

As the resin that forms the arm body 2 and the connection sections 4, it is preferred to adopt a resin that has such flame retardance that, even when the arm body 2 and the connection sections 4 are disposed in the vertical direction and are subjected to fire for 10 seconds, flame duration is 10 seconds or less, and the arm body 2 and the connection sections 4 do not burn by 127 mm or more. Furthermore, it is preferred that, when each test piece ((125±5)×(13±0.5)×t) mm is directly mounted on a clamp and is subjected to 10-second flame contact with a 20-mm flame twice, the burning time of the test piece be 10 seconds or less, the total burning time of five test pieces be 50 seconds or less, the burning+glowing time of each test piece be 30 seconds or less, fire not spread to the clamp, and cotton disposed below the test piece not be ignited. With this configuration, even if the robot arm 1 overheats for some reason, there is an advantage in that self-extinguishing can be secured. Even if the performance of flame retardance does not satisfy the above-described conditions and is of a level slightly inferior thereto, it is needless to say that the functions of the robot arm 1 are satisfied.

As the resin itself, instead of using a resin that has the above-described flame retardance, it is also possible to adopt a resin that has a low flame retardance and that is coated on the entire outer surface thereof with a paint having higher flame retardance than the resin.

An arbitrary thermosetting or thermoplastic resin can also be adopted as the resin.

An arbitrary fiber-reinforced resin, such as a glass-fiber-reinforced resin, can also be adopted as the resin. In a glass-fiber-reinforced resin, since fibers are colorless and transparent, it is possible to cut the painting cost by mixing a color into a base material.

In a case in which a resin that contains carbon fibers is adopted as the resin, it is preferred that the carbon fibers be oriented in the longitudinal-axis direction of the arm body 2, the carbon fibers be disposed in a contact state, and the carbon fibers and the metal plate 5 be in contact with each other. Accordingly, it is possible to cause the metal plates 5, which are disposed at both ends of the robot arm 1, to be electrically conductive. Specifically, if electric machinery, such as an electric tool, is mounted at the distal end of the robot arm 1, the electric machinery can be electrically grounded without additionally providing a ground wire.

Then, if a resin that contains carbon fibers is adopted in this way, it is preferred that the metal plate 5, which is to be embedded in the resin, be formed of a metal material having higher corrosion resistance than aluminum, for a combination with the carbon fibers. Accordingly, it is possible to prevent corrosion of the metal plate 5 and to improve the durability thereof.

Figure 13:
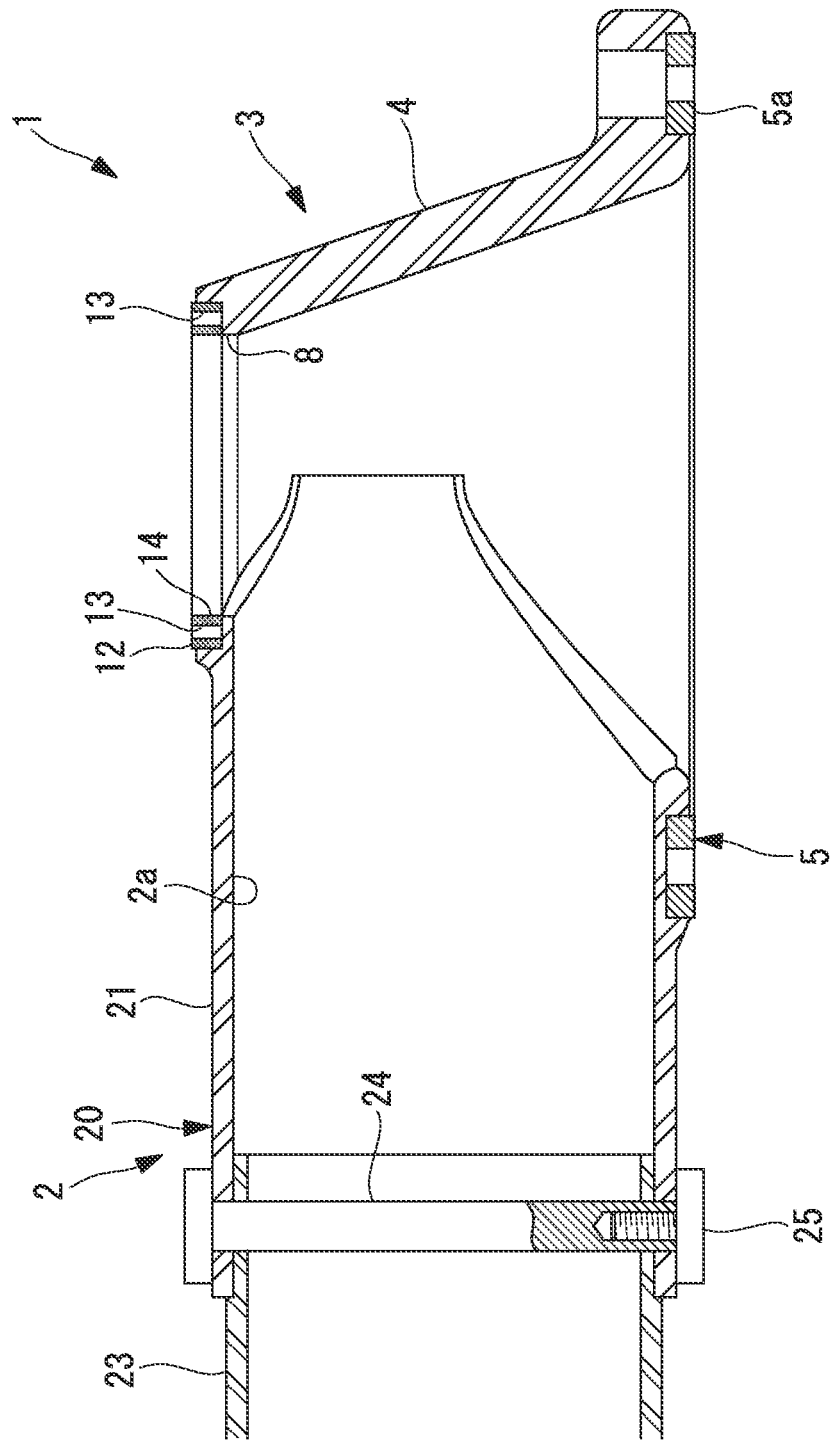
FIG. 13 is a longitudinal sectional view showing a modification of a joining method for an end part and a central part of the robot arm shown in FIG. 1.

Although the end parts 21 and 22 and the central part 23 can be joined by an arbitrary joining method, instead of this, as shown in FIG. 13, it is also possible to fit cylindrical sections of the end parts 21 and 22 onto the central part 23 and to mechanically fix, at the fitting sections, the end parts 21 and 22 and the central part 23 by means of: shafts 24 that penetrate the fitting sections in a radial direction; and fixing bolts 25. With this structure, it is possible to prevent a mutual displacement in position between the end parts 21 and 22 and the central part 23 caused when the end parts 21 and 22 and the central part 23 become dislocated from each other in the longitudinal-axis direction or are rotated about the longitudinal axis.

As a mechanical fixing method, mechanical coupling elements, such as a bolt and a rivet, can be used. In this case, it is desirable to additionally use a metal member, such as a washer or a spacer, in order to prevent seating-surface depression and to strengthen a female screw. Because the bolt and the rivet are made of metal, electrical conduction can be easily secured.

As a mechanical fixing method, it is also possible to adopt a key and a keyway, spline coupling, or the like, involving engagement in the circumferential direction. For a further increase in strength and rigidity, a structural adhesive may also be used at the same time.

Figure 14:
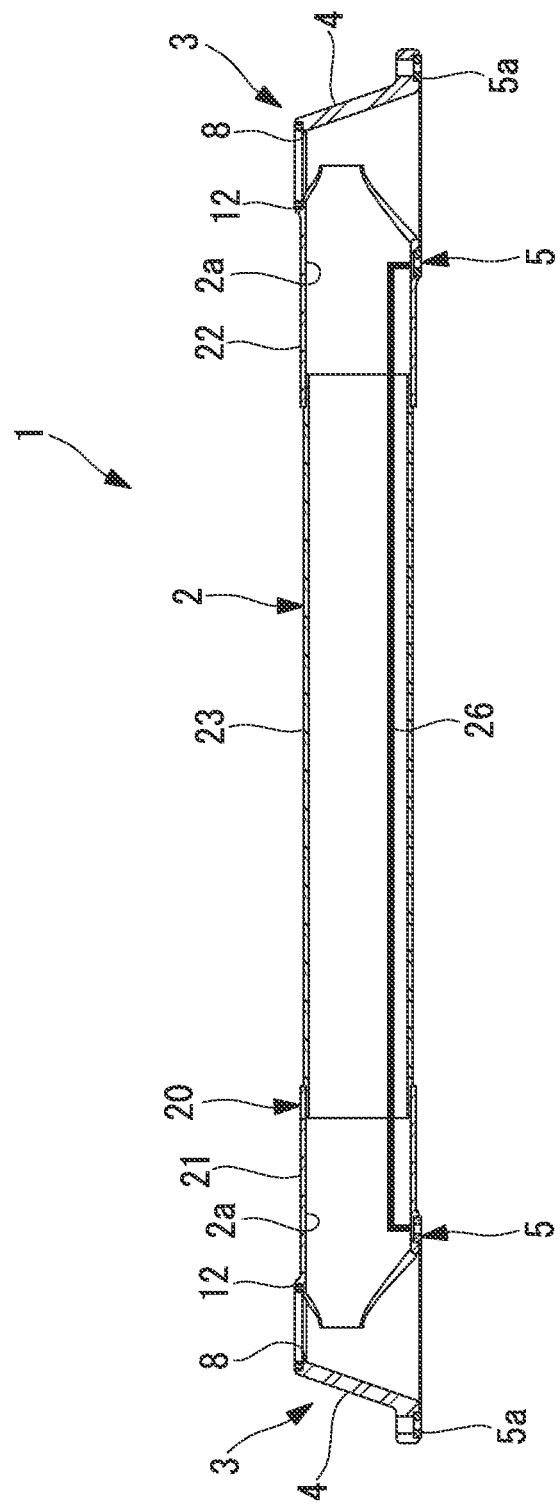
FIG. 14 is a longitudinal sectional view showing an example electrical conduction method for metal plates of the robot arm shown in FIG. 1.

As shown in FIG. 14, it is also possible to form the end parts 21 and 22 and the central part 23 of a non-conductive resin and to connect the metal plates 5, which are disposed at both ends of the robot arm 1, by a cable 26, thus causing the metal plates 5 to be electrically conductive.

Figure 15:
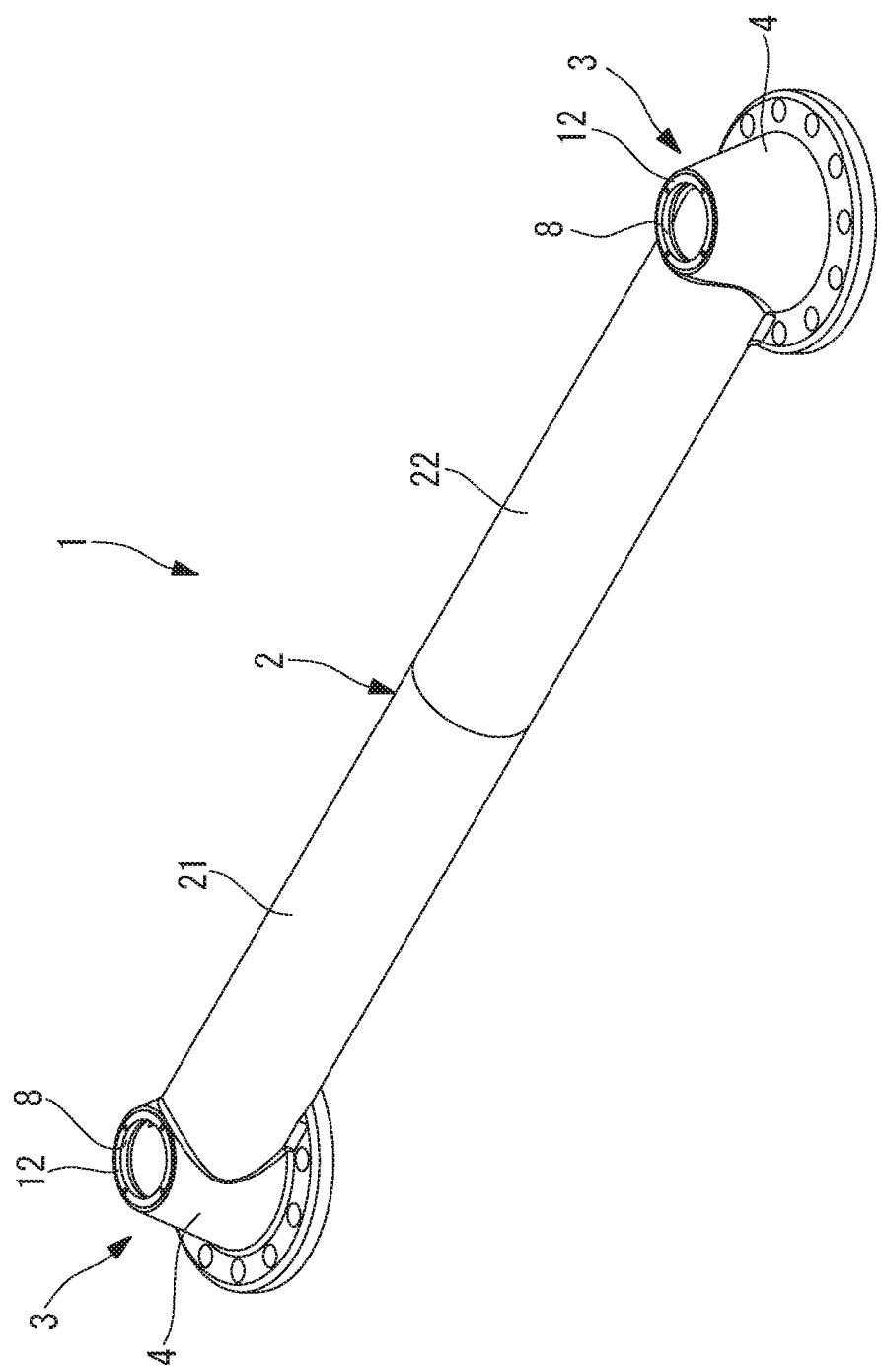
FIG. 15 is a perspective view showing a modification of the robot arm shown in FIG. 1.

In this embodiment, although the two end parts 21 and 22, which have the same shape, are coupled by the simple cylindrical central part 23, instead of this, as shown in FIG. 15, it is also possible to divide the arm body 2 at the center thereof and to directly join the two end parts 21 and 22, which have the same shape, thus manufacturing the robot arm 1.

Figure 16:
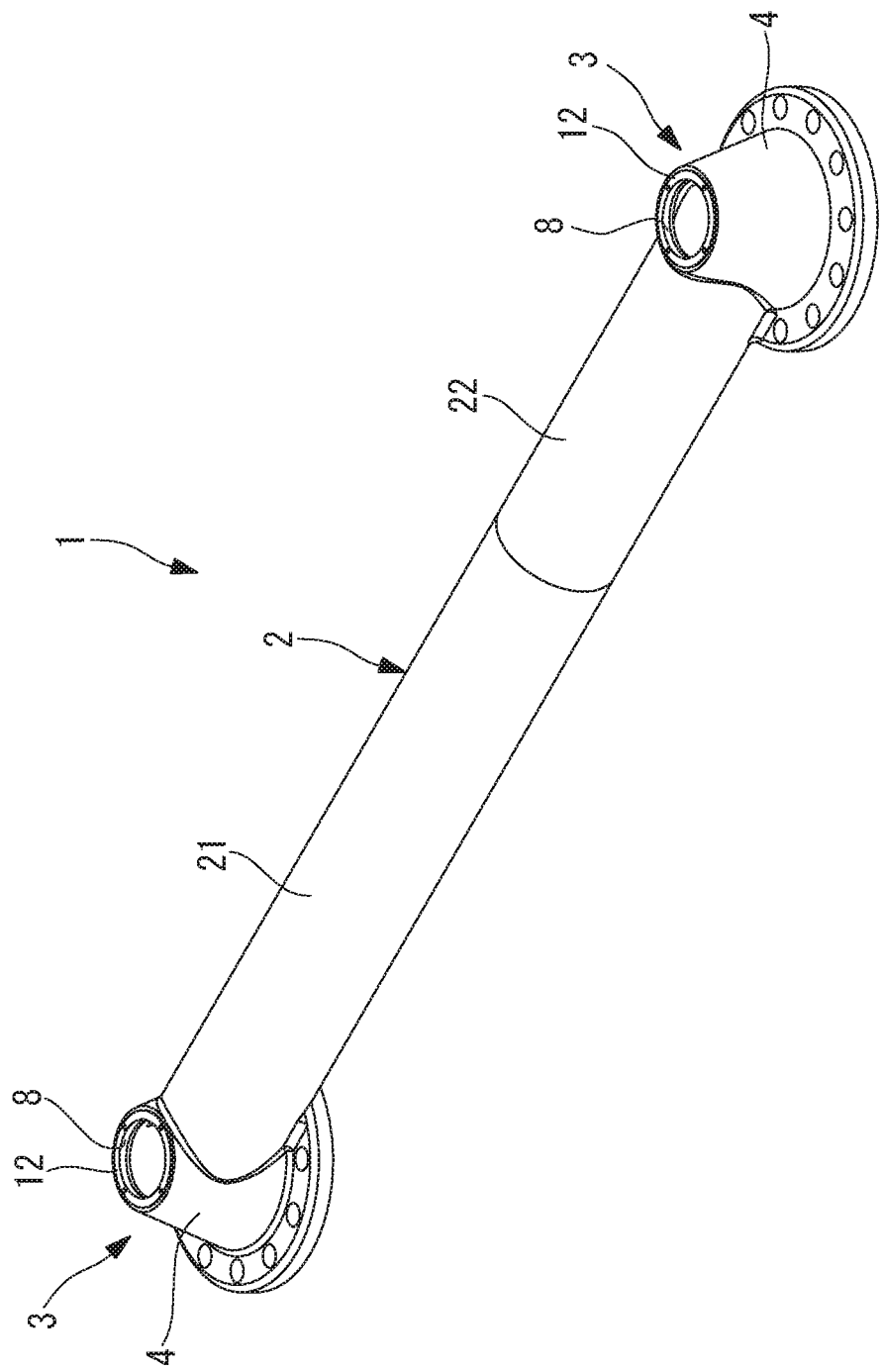
FIG. 16 is a perspective view showing another modification of the robot arm shown in FIG. 1.

As shown in FIG. 16, it is also possible to prepare two types of end parts 21 and 22 whose sections, each forming a section of the arm body 2, have different lengths and to directly join the end parts 21 and 22, thereby manufacturing the robot arm 1. In this case, robot arms 1 of three lengths can be manufactured by using a combination of short end parts 21 and 22, a combination of long end parts 21 and 22, and a combination of a long end part 21 and a short end part 22, thus making it possible to realize various arm reach variations. By preparing two or more types of end parts 21 and 22 having different lengths, even more arm reach variations can be realized.

The robot 100 of this embodiment may also be provided with two or more of the above-described robot arms 1. For example, the above-described robot arm 1 is adopted for each of a forearm and an upper arm of the robot 100, thus making it possible to configure the robot 100 that is light in weight, at low cost. The cost can be further reduced by adopting two or more robot arms 1 having the same length. By adopting two or more robot arms 1 having different lengths obtained by making the lengths of arm bodies 2 different, it is possible to configure robots 100 having various reach lengths.

Figure 17:
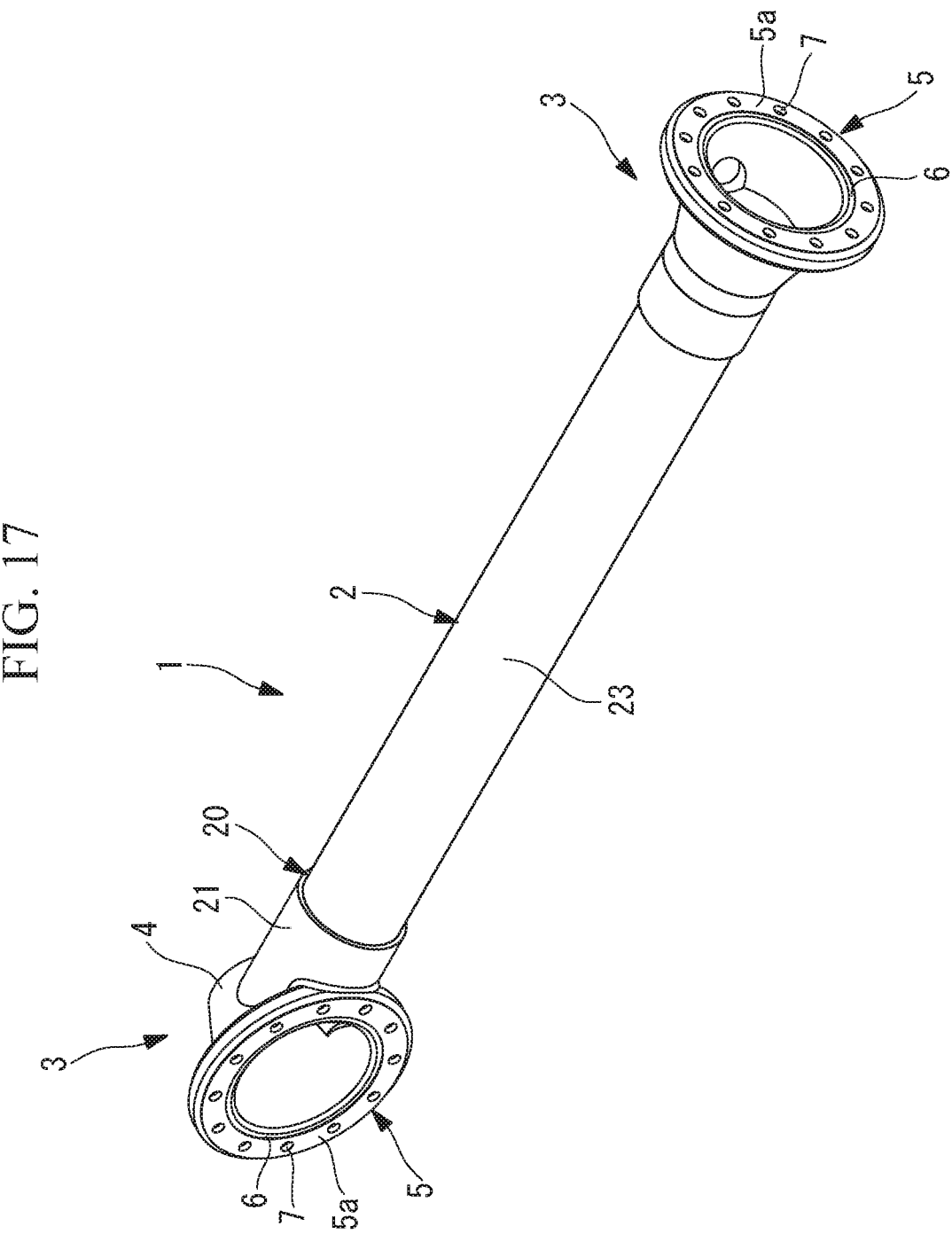
FIG. 17 is a perspective view showing still another modification of the robot arm shown in FIG. 1.
Figure 18:
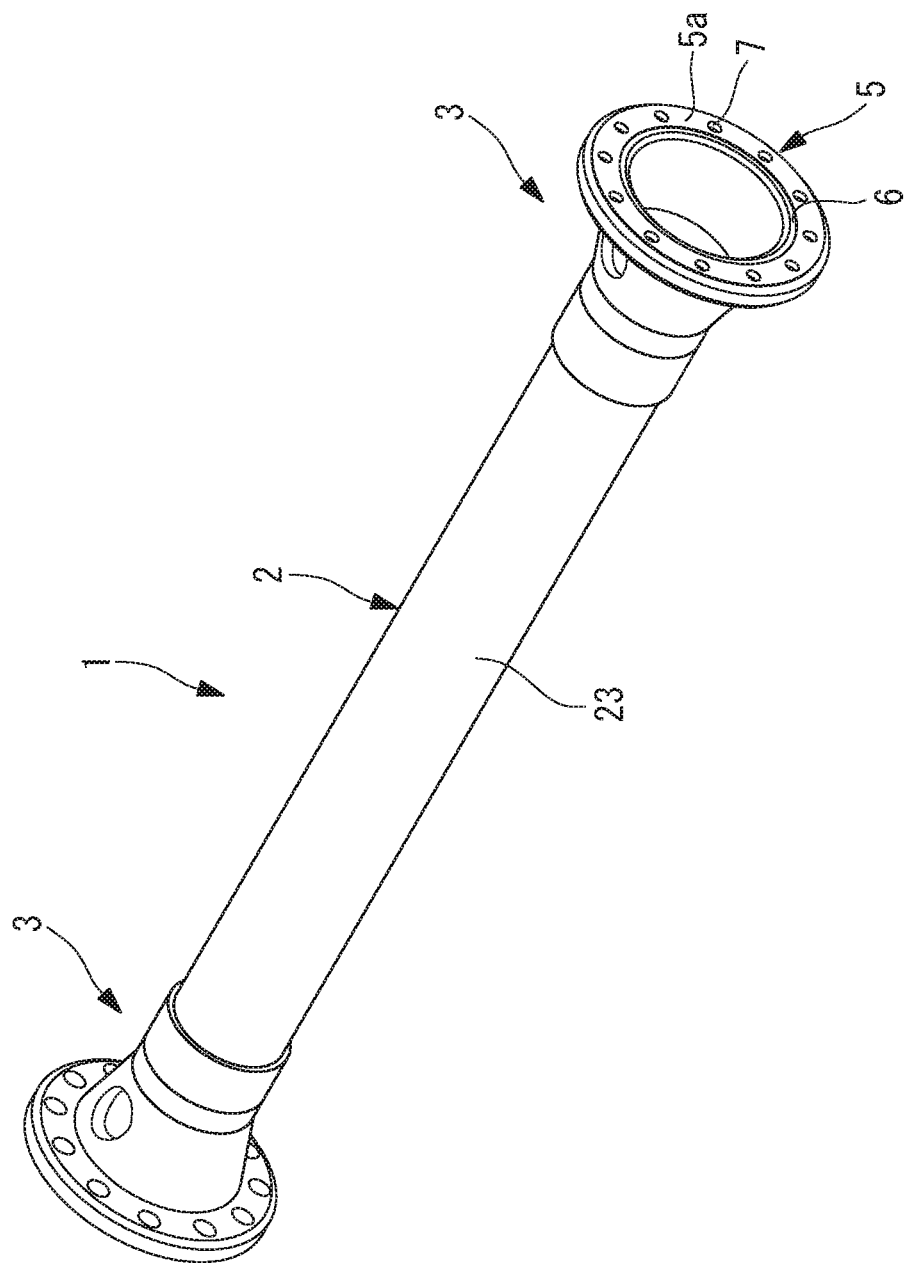
FIG. 18 is a perspective view showing still another modification of the robot arm shown in FIG. 1.

In this embodiment, although the mounting interface portions 3, which cause the inner hole 2a of the arm body 2 to curve in a direction perpendicular thereto, are provided at both ends of the arm body 2, instead of this, as shown in FIGS. 17 and 18, it is also possible to adopt, as the mounting interface portion 3, a mounting interface portion that has a mounting surface 5a extending in a direction perpendicular to the longitudinal axis of the arm body 2 and that makes the inner hole 2a of the arm body 2 open in the longitudinal-axis direction. As the length of the arm body 2 is increased, it becomes difficult to form a mold; therefore, the structure of the present invention is effective.

The advantageous effect of the divided structure of the present invention can be exhibited more in the robot arm 1 that is provided with, at least one of both ends of the arm body 2, a mounting interface portion 3 that causes the inner hole 2a of the arm body 2 to curve in a direction perpendicular thereto, as shown in FIG. 1 or 17, than in the robot arm 1 that has a mounting surface 5a extending in a direction perpendicular to the longitudinal axis of the arm body 2 and that makes the inner hole 2a of the arm body 2 open in the longitudinal-axis direction, as shown in FIG. 18.

In this embodiment, the robot arm 1 in which the end parts 21 and 22 and the central part 23 overlap is shown in FIG. 6. The overlap amount may be set to any length as long as the arm strength can be secured. However, the center holes 6 and the inner hole 2a need to communicate with each other in order to pass wiring through the robot arm 1.

As a result, the following aspect is derived from the above described embodiment.

According to one aspect, the present invention provides a robot arm including: a long cylindrical arm body; and mounting interface portions that are fixed to both sides of the arm body and that are used to mount the robot arm to another member, wherein at least sections of outer surfaces of the arm body and the mounting interface portions are formed of a resin; and a first part that has one of the mounting interface portions and a section of the arm body and a second part that has the other one of the mounting interface portions and another section of the arm body are joined to each other.

According to this aspect, because at least sections of the arm body and the mounting interface portions, the arm body and the mounting interface portions constituting the robot arm, are formed of a resin, it is possible to achieve significant weight reduction, compared with a conventional robot arm that uses a metal material. In this case, the shape having the mounting interface portions at both ends of the long cylindrical arm body cannot be molded in one step by using a forming mold.

With regard to this issue, according to this aspect, the arm body is divided in the longitudinal direction, the first part and the second part, whose internal spaces are open in at least one direction, can be easily molded by using a forming mold, and the molded first part and the molded second part are joined, thereby making it possible to easily perform manufacturing. Accordingly, the manufacturing cost can be reduced. Various arm variations can be relatively easily formed by merely changing the length of the arm body.

In the above-described aspect, each of the mounting interface portions may be provided with: a metal member that forms a mounting surface used to mount the robot arm to the other member; and a connection section that is formed of a resin, in which the metal member is embedded in a state in which at least the mounting surface on the metal member is exposed, and that is connected to the arm body.

With this configuration, the metal members are precisely machined and are respectively embedded in the resin that forms the mounting interface portions, which are disposed at both ends of the arm body, thereby making it possible to realize a robot arm having two mounting surfaces that are precisely positioned without being machined, and to reduce the manufacturing cost.

In the above-described aspect, the metal member may be formed into a ring-shaped plate having, at the center thereof, a center hole penetrating therethrough in the plate-thickness direction; and the connection section may have an internal space that is connected to an inner hole of the arm body and that is open to the outside in the center hole of the metal member.

With this configuration, it is possible to make the internal space continue to the mounting surfaces, which are located at both ends, through the inner hole of the arm body.

In the above-described aspect, the mounting surface may be disposed in parallel with the longitudinal axis of the arm body.

With this configuration, the robot arm that is rotated about the central axis of the metal member located at one end of the arm body is formed.

In the above-described aspect, the metal member may have a through-hole that penetrates therethrough in the plate-thickness direction and through which a mounting screw is made to pass, and the metal member may be embedded in the resin that forms the connection section, with the mounting surface and a seating surface, for the mounting screw, around the through-hole being exposed, the seating surface being located on a back surface of the mounting surface.

With this configuration, when the robot arm is fixed to a mounting-target body, such as an actuator, by the mounting screws, which are made to pass through the through-holes in the metal members provided on the mounting interface portions, because the surfaces of the metal members are exposed as the seating surfaces for the mounting screws, it is possible to fasten the mounting screws without a resin intervening between the heads of the mounting screws and the mounting-target body, and to more reliably fix the robot arm by preventing loosening etc. of the mounting screws caused by a repeated stress action.

In the above-described aspect, the resin that forms each of the mounting interface portions and the metal member may be fixed to each other by fitting a projecting portion that is provided in one of the resin and the metal member into a recessed portion that is provided in the other one of the resin and the metal member.

With this configuration, when the metal member is embedded in the resin that forms the mounting interface portion, the recessed portion and the projecting portion are fitted to each other, thus making it possible to prevent a displacement of the metal member with respect to the resin even when an external force acts thereon. In this case, a recessed portion and a projecting portion that are formed through machining may be fitted to each other, or a dissolved resin may be poured into an uneven section formed on the metal member through chemical treatment, to fit the metal member.

In the above-described aspect, the two metal members may be electrically conductive.

With this configuration, electric machinery etc. to be mounted at the distal end of the robot arm can be easily electrically grounded.

In the above-described aspect, the metal members may be formed of a metal material having higher corrosion resistance than aluminum, for a combination with carbon fibers.

With this configuration, even when a resin that contains carbon fibers is used, it is possible to prevent corrosion of the metal members and to improve the durability thereof.

In the above-described aspect, the first part and the second part may have the same shape.

With this configuration, it is merely necessary to mold two parts of one type and to join the two parts to each other; thus, it is possible to reduce the manufacturing cost by reducing the number of types of parts.

In the above-described aspect, the second part may be obtained by joining a third part that has the same shape as the first part to a fourth part that extends a section of the arm body, the section corresponding to the third part.

With this configuration, the first part and the third part are formed into the same shape, thereby making it merely necessary to mold two parts of one type and to join the two parts to each other; thus, it is possible to reduce the manufacturing cost by reducing the number of types of parts. By adjusting the length of the fourth part joined to the third part, the length of the arm body can be adjusted.

In the above-described aspect, the fourth part may be a tubular body that is formed of a resin and that is uniform in cross section.

With this configuration, the manufacturing cost of the robot arm can be reduced due to the fourth part, which can be easily molded. The fourth part is formed of a tubular body that is uniform in cross section, thereby making it possible to easily mold arm bodies having different lengths.

In the above-described aspect, the fourth part may be a tubular body that is obtained by coating an outer surface of a metal pipe with a resin and that is uniform in cross section.

With this configuration, the manufacturing cost of the robot arm can be reduced due to the fourth part, which can be easily molded. The fourth part is formed of a tubular body that is uniform in cross section, thereby making it possible to easily mold arm bodies having different lengths. By disposing a metal pipe on an inner surface of the tubular body, the rigidity of the robot arm can be increased. Because at least a section of the surface thereof is covered with a resin, which is softer than a metal, if the robot arm is brought into contact with a person, a force applied to the person can be reduced compared with a case in which only a metal is used.

In the above-described aspect, the first part and the second part may be joined by means of a mechanical coupling element.

With this configuration, it is possible to increase the joint strength, compared with a case in which the first part and the second part are joined by an adhesive, and to easily provide electrical conduction through the joint of the first part and the second part. A bolt, a rivet, or the like can be used, for example, as a mechanical coupling element.

In the above-described aspect, the resin that forms the arm body and the mounting interface portions may have such flame retardance that, even when the arm body and the mounting interface portions are disposed in the vertical direction and are subjected to fire for 10 seconds, flame duration is 10 seconds or less, and the arm body and the mounting interface portions do not burn by 127 mm or more.

With this configuration, self-extinguishing of the robot arm can be secured.

In the above-described aspect, outer surfaces of the resin that forms the arm body and the mounting interface portions may be coated with a paint having such flame retardance that, even when the arm body and the mounting interface portions are disposed in the vertical direction and are subjected to fire for 10 seconds, flame duration is 10 seconds or less, and the arm body and the mounting interface portions do not burn by 127 mm or more.

With this configuration, self-extinguishing of the robot arm can be secured due to the paint having high flame retardance.

According to another aspect, the present invention provides a robot-arm manufacturing method for a robot arm that has, at both ends of a long cylindrical arm body, mounting interface portions for mounting the robot arm to another member, the method including: molding a first part that has one of the mounting interface portions and a section of the arm body, and of which at least a section of an outer surface is formed of a resin; molding a second part that has the other one of the mounting interface portions and another section of the arm body, and of which at least a section of an outer surface is formed of a resin; and joining the molded first part and the molded second part to each other in a positioned state.

In the above-described aspect, the first part and the second part may be molded through injection molding or press molding.

According to still another aspect, the present invention provides a robot-arm manufacturing method for a robot arm that has, at both ends of a long cylindrical arm body, mounting interface portions for mounting the robot arm to another member, the method including: molding a first part and a third part that have the mounting interface portions and sections of the arm body, of which at least sections of outer surfaces are formed of a resin, and that have the same shape; molding a cylindrical fourth part that extends the section of the arm body, the section corresponding to the first part; and disposing the fourth part between the molded first part and the molded third part and joining them to one another in a positioned state.

In the above-described aspect, the first part, the third part, and the fourth part may be molded through injection molding or press molding.

In the above-described aspect, the first part, the third part, and the fourth part may be fixed in the same forming mold in a positioned state and may be then integrally joined so as to form the final shape of the robot arm.

According to still another aspect, the present invention provides a robot including one of the above-described robot arms.

The above-described aspect may further include at least one robot arm that is identical to the robot arm.

In the above-described aspect, the mounting interface portions of the respective robot arms may have the same shape; and the arm bodies of the respective robot arms may have different lengths.

In the above-described aspect, the robot arms may have the same length.

REFERENCE SIGNS LIST 1 robot arm
2 arm body
2a inner hole
3 mounting interface portion
5 metal plate (metal member)
5a mounting surface
6 center hole
7 through-hole
9 mounting screw
10 lid member
15 projecting portion
16 recessed portion
20 second part
21, 22 end part (first part, third part)
23 central part (fourth part)
100 robot

The invention claimed is:
1. A robot arm comprising:
a cylindrical arm body;
mounting interface portions that are fixed to both sides of the cylindrical arm body and that are used to mount the robot arm to another member;
wherein each of the mounting interface portions is provided with a metal plate that forms a mounting surface used to mount the robot arm to the other member;
wherein at least sections of outer surfaces of the cylindrical arm body and the mounting interface portions are formed of a resin;
wherein each of the mounting surfaces is external to a respective mounting interface portion;
wherein one of the mounting interface portions and a section of the arm body form a first part and the other one of the mounting interface portions and another section of the arm body form a second part, the first part and the second part being inseparably joined to each other to be integrally formed; and
wherein an internal space of the robot arm is continuous between the mounting surfaces on both sides of the arm body through an inner hole of the arm body,
wherein each of the mounting interface portions is provided with a connection section that is formed of a resin, in which the metal plate is embedded in a state in which at least the mounting surface on the metal plate is exposed, and that is connected to the cylindrical arm body.

2. The robot arm according to claim 1,
wherein the metal plate is formed into a ring-shaped plate having, at the center thereof, a center hole penetrating therethrough in the plate-thickness direction; and
wherein the connection section has an internal space that is connected to an inner hole of the cylindrical arm body and that is open to the outside in the center hole of the metal plate.

3. The robot arm according to claim 1, wherein the mounting surface is disposed in parallel with the longitudinal axis of the cylindrical arm body.

4. The robot arm according to claim 1, wherein the metal plate has a through-hole that penetrates therethrough in the plate-thickness direction and through which a mounting screw is made to pass, and the metal plate is embedded in the resin that forms the connection section, with the mounting surface and a seating surface, for the mounting screw, around the through-hole being exposed, the seating surface being located on a back surface of the mounting surface.

5. The robot arm according to claim 1, wherein the resin that forms each of the mounting interface portions and the metal plate are fixed to each other by fitting a projecting portion that is provided in one of the resin and the metal plate into a recessed portion that is provided in the other one of the resin and the metal plate.

6. The robot arm according to claim 1, wherein the metal plates are electrically conductive.

7. The robot arm according to claim 1, wherein the metal plates are formed of a metal material having higher corrosion resistance than aluminum, for a combination with carbon fibers.

8. The robot arm according to claim 1, wherein the first part and the second part have the same shape.

9. The robot arm according to claim 1, wherein the second part is obtained by joining a third part that has the same shape as the first part to a fourth part that extends a section of the cylindrical arm body, the section corresponding to the third part.

10. The robot arm according to claim 9, wherein the fourth part is a tubular body that is formed of a resin and that is uniform in cross section.

11. The robot arm according to claim 9, wherein the fourth part is a tubular body that is obtained by coating an outer surface of a metal pipe with a resin and that is uniform in cross section.

12. The robot arm according to claim 1, wherein the resin that forms the cylindrical arm body and the mounting interface portions has flame retardance such that, in a case in which the cylindrical arm body and the mounting interface portions are disposed in the vertical direction and are subjected to fire for 10 seconds, and subsequently the fire is released, flame duration of the cylindrical arm body and the mounting interface portions subjected to the fire is 10 seconds or less.

13. The robot arm according to claim 1, wherein outer surfaces of the resin that forms the cylindrical arm body and the mounting interface portions are coated with a paint having flame retardance such that, in a case in which the cylindrical arm body and the mounting interface portions are disposed in the vertical direction and are subjected to fire for 10 seconds, and subsequently the fire is released, flame duration of the cylindrical arm body and the mounting interface portions subjected to the fire is 10 seconds or less.

14. A robot comprising a robot arm according to claim 1.

15. The robot according to claim 14, further comprising at least one robot arm identical to the robot arm.

16. The robot according to claim 15, wherein:
   the mounting interface portions of the respective robot arms have the same shape; and
   the arm bodies of the respective robot arms have different lengths.

17. The robot according to claim 15, wherein the robot arms have the same length.

* * * * *